US011790003B2

(12) United States Patent
Scarborough et al.

(10) Patent No.: US 11,790,003 B2
(45) Date of Patent: Oct. 17, 2023

(54) CLIENT-BASED SEARCH QUERY AUTOCOMPLETE

(71) Applicant: Red Hat, Inc., Raleigh, NC (US)

(72) Inventors: James E. Scarborough, Raleigh, NC (US); John Pratt, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 277 days.

(21) Appl. No.: 17/107,427

(22) Filed: Nov. 30, 2020

(65) Prior Publication Data

US 2022/0171812 A1 Jun. 2, 2022

(51) Int. Cl.
*G06F 16/00* (2019.01)
*G06F 16/9032* (2019.01)
*G06F 16/9538* (2019.01)
*G06F 16/9532* (2019.01)

(52) U.S. Cl.
CPC .... *G06F 16/90328* (2019.01); *G06F 16/9532* (2019.01); *G06F 16/9538* (2019.01)

(58) Field of Classification Search
CPC ........... G06F 16/90328; G06F 16/9532; G06F 16/9538; G06F 16/9032
See application file for complete search history.

(56) References Cited

U.S. PATENT DOCUMENTS

| | | | | |
|---|---|---|---|---|
| 7,647,312 B2* | 1/2010 | Dai | ..................... | G06F 16/3322 707/999.004 |
| 8,370,329 B2* | 2/2013 | Gutt | .................... | G06F 16/3326 707/721 |
| 9,235,654 B1* | 1/2016 | Gupta | ................ | G06F 16/90324 |
| 10,572,548 B2 | 2/2020 | Burkard et al. | | |
| 2008/0065617 A1 | 3/2008 | Burke et al. | | |
| 2010/0082649 A1* | 4/2010 | Gutt | ....................... | G06F 16/951 707/E17.014 |
| 2014/0195519 A1* | 7/2014 | Holt | .................... | G06F 16/3322 707/722 |
| 2015/0170050 A1* | 6/2015 | Price | ................... | G06F 16/2477 706/13 |

(Continued)

OTHER PUBLICATIONS

Monaco, John V., "What Are You Searching for? A Remote Keylogging Attack on Search Engine Autocomplete," 28th USENIX Security Symposium, 2019, 19 pages.

(Continued)

*Primary Examiner* — Jared M Bibbee
(74) *Attorney, Agent, or Firm* — Dority & Manning, P.A.

(57) ABSTRACT

Client-based search query autocomplete is disclosed. A search engine server system sends a search web page of a search engine to a content distribution network (CDN) server system for delivery to a client computing device. The search web page includes a query dialog box and an autocomplete service that is configured to present search query suggestions on a display device. The search engine server system receives, from the CDN server system, a search query list request for a predetermined list of search query suggestions, the search query list request originating from the autocomplete service of the search web page executing on the client computing device. The search engine server system sends the predetermined list of search query suggestions to the CDN server system for delivery to the client computing device.

18 Claims, 9 Drawing Sheets

(56) References Cited

U.S. PATENT DOCUMENTS

2019/0236217 A1* 8/2019 Eroshin .............. G06F 40/279
2019/0362013 A1 11/2019 Lewis et al.

OTHER PUBLICATIONS

Author Unknown, "Create a suggester to enable autocompleteand suggested results in a query," https://docs.microsoft.com/en-us/azure/search/index-add-suggesters, Apr. 21, 2020, 7 pages.

* cited by examiner

CLIENT-BASED SEARCH QUERY AUTOCOMPLETE

BACKGROUND

A web-based search engine typically offers a front-end component, such as a search query web page, that runs on a client computing device that communicates via a network with a back-end component, such as a query engine, that runs on a server computing device. The front-end component receives a search query from a user and sends the search query over the network, such as the Internet, to the back-end component. The back-end component performs the search and sends the results of the search to the front-end component for presentation to the user on the client computing device.

SUMMARY

The examples disclosed herein implement a client-based search query autocomplete function using a predetermined list of search query suggestions generated based on an analysis of a plurality of searches and results of the plurality of searches over a period of time.

In one example a method is provided. The method includes sending, by a search engine server system comprising at least one computing device, a search web page of a search engine to a content distribution network (CDN) server system for delivery to a client computing device, the search web page comprising a query dialog box and an autocomplete service that is configured to present search query suggestions on a display device. The method further includes receiving, by the search engine server system from the CDN server system, a search query list request for a predetermined list of search query suggestions, the search query list request originating from the autocomplete service of the search web page executing on the client computing device. The method further includes sending, by the search engine server system, the predetermined list of search query suggestions to the CDN server system for delivery to the client computing device, the predetermined list of search query suggestions generated based on an analysis of a plurality of searches and results of the plurality of searches, the predetermined list of search query suggestions comprising a plurality of entries, each entry comprising one or more search terms that were identified in the analysis.

In another example a system is provided. The system includes a search engine server system that comprises at least one first memory and at least one first processor device coupled to the at least one first memory to send a search web page of a search engine to a content distribution network (CDN) server system for delivery to a client computing device, the search web page comprising a query dialog box and an autocomplete service that is configured to present search query suggestions on a display device. The processor device is further to receive, from the CDN server system, a search query list request for a predetermined list of search query suggestions, the search query list request originating from the autocomplete service of the search web page executing on the client computing device. The processor device is further to send the predetermined list of search query suggestions to the CDN server system for delivery to the client computing device, the predetermined list of search query suggestions generated based on an analysis of a plurality of searches and results of the plurality of searches, the predetermined list of search query suggestions comprising a plurality of entries, each entry comprising one or more search terms that were identified in the analysis.

In another example a non-transitory computer-readable storage medium is provided. The non-transitory computer-readable storage medium includes executable instructions to cause a processor device to send a search web page of a search engine to a content distribution network (CDN) server system for delivery to a client computing device, the search web page comprising a query dialog box and an autocomplete service that is configured to present search query suggestions on a display device. The executable instructions further cause the processor device to receive, from the CDN server system, a search query list request for a predetermined list of search query suggestions, the search query list request originating from the autocomplete service of the search web page executing on the client computing device. The executable instructions further cause the processor device to send the predetermined list of search query suggestions to the CDN server system for delivery to the client computing device, the predetermined list of search query suggestions generated based on an analysis of a plurality of searches and results of the plurality of searches, the predetermined list of search query suggestions comprising a plurality of entries, each entry comprising one or more search terms that were identified in the analysis.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
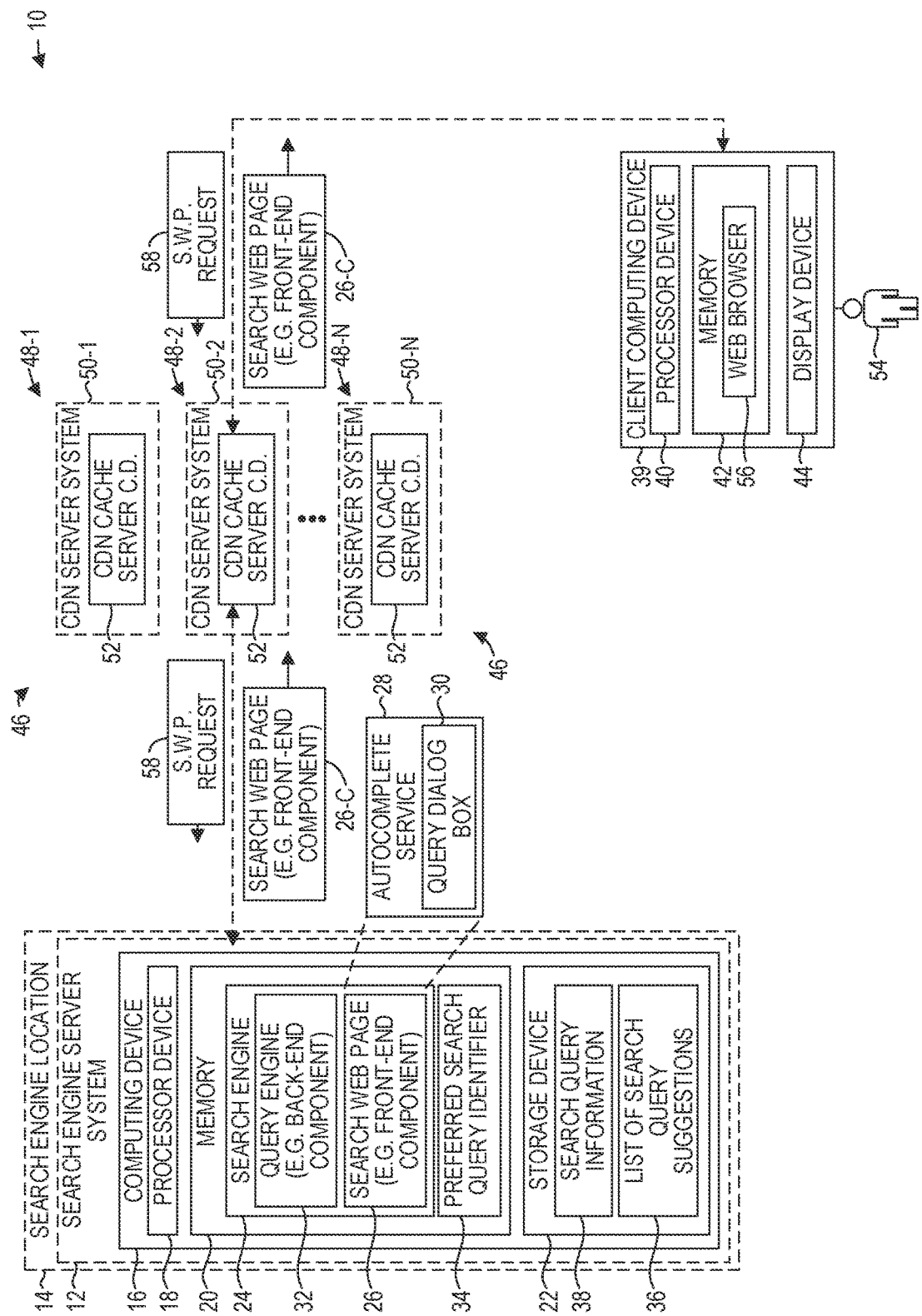
FIGS. 1A-1C are a block diagrams, at three different points in time, of an environment in which client-based search query autocomplete may be implemented.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A web-based search engine typically offers a front-end component that runs on a client computing device that communicates via a network with a back-end component that runs on a server computing device. The front-end component receives a search query from a user and sends the search query over the network, such as the Internet, to the back-end component. The back-end component performs the search and sends the results of the search to the front-end component for presentation to the user on the client computing device.

The front-end component typically receives a search query from a user via a query dialog box into which the user enters one or more search terms. Some search engines offer a real-time search query suggestion feature, sometimes referred to as autocomplete, that presents search query suggestions to the user in real-time based on the search query that is currently being entered by the user.

The autocomplete feature is implemented via real-time interactions between the front-end component and the back-end component as the user enters search terms. As an example, if a user enters the characters "tru" into the query dialog box of the front-end component, the front-end component sends the characters "tru" to the back-end component over a network. The back-end component, based on the characters "tru", determines one or more search query suggestions. The search query suggestions may comprise one or more search terms. For example, the back-end component may determine the search query suggestions "truck", "truck stop", "truck pickup", and "trunk". The back-end component sends the search query suggestions "truck", "truck stop", "truck pickup", and "trunk" to the front-end component over the network. The front-end component presents the search query suggestions "truck", "truck stop", "truck pickup", and "trunk". Due to the real-time nature of the interactions between the front-end component and the back-end component, the search query suggestions may be presented to the user even before the user enters a next character. If the user enters another character, such as the character "m", the interactions repeat. The back-end component may determine as search query suggestions the words "trumpet" and "trumping", and the back-end component sends the search query suggestions "trumpet" and "trumping" to the front-end component over the network. The front-end component presents the search query suggestions "trumpet" and "trumping" to the user.

The real-time interactions between the front-end component and the back-end component result in the presentation of search query suggestions substantially instantaneously as the user enters a search query into the query dialog box when the network communications round-trip time (RTT) between the front-end component and back-end component is sufficiently low (i.e., fast). However, when the RTT becomes relatively high (i.e., slow), the autocomplete feature becomes less useful because the user has already begun typing additional characters before the front-end component has received the search query suggestions that were provided by the back-end component in response to the previous characters typed by the user.

Often the back-end component of a search engine is physically centralized in a particular location rather than being distributed among different geographic locations. This may be to increase security of user information associated with search queries, such as user data that is collected and maintained by the search engine, or for any number of other reasons. Unfortunately, if users of the search engine are physically distant from the location of the search engine, such as in another country, the RTT between the front-end component and the back-end component can become substantial, resulting in an unsatisfying experience for the user.

The examples disclosed herein implement a client-based search query autocomplete function. A predetermined list of search query suggestions is generated based on an analysis of a plurality of searches and results of the plurality of searches over a period of time. When a client computing device requests the search web page of the search engine, a search engine server system provides the search web page to the client computing device via a content delivery network (CDN) server system. The search web page includes an autocomplete service. The search engine server system receives, from the CDN server system, a search query list request for a predetermined list of search query suggestions, the search query list request originating from the autocomplete service of the search web page executing on the client computing device. The search engine server system sends the predetermined list of search query suggestions to the CDN server system for delivery to the client computing device. When a user begins entering a search query term into a query dialog box of the search web page, the autocomplete service, rather than interacting with the back-end component of the search engine, analyzes the predetermined list of search query suggestions for suggested search queries based on the characters entered by the user to thereby identify a subset of search query suggestions from the predetermined list of search query suggestions. The autocomplete service presents the subset of search query suggestions on a display device.

In this manner, the front-end component need not interact with the back-end component to provide search query suggestions, eliminating the lag that may otherwise result from a long RTT between the front-end component and the back-end component, and eliminating network traffic that would otherwise be necessary. Subsequent requests for the predetermined list of search query suggestions from any front-end component served by the same CDN server system can be satisfied by the CDN server system, thus eliminating additional requests to the search engine server system.

FIG. 1A is a block diagram of an environment 10 in which examples may be practiced. The environment 10 includes a search engine server system 12 at a location 14. The search engine server system 12 provides search engine capabilities to a plurality of users. The search engine server system 12 includes at least one computing device 16, but may include any number of computing devices 16 across which search queries and other responsibilities may be load-balanced.

The location 14 may comprise a geographic location of a data center. In some examples, the search engine capability may be provided solely from the location 14 and not distributed geographically around a country, or the world. This may be because, for example, the information maintained at the location 14 may be sensitive information, such as confidential and proprietary information, and/or private information, and while it is possible to implement high-level security, including physical security, at one location 14, it may be impractical or even impossible to do so at multiple geographic locations throughout the world.

The computing device 16 includes one or more processor devices 18, one or more memories 20 and one or more storage devices 22. The computing device 16 includes a web-based search engine 24, which includes a front-end component and a back-end component. The front-end component is a search web page 26, which is provided to users who desire to perform a search query. Upon request, such as when a web browser requests the content of a uniform resource identifier (URI) that corresponds to the search web page 26, the search web page 26 is communicated to the web browser over one or more networks. In some examples, one of the networks may be the Internet. The search web page 26 includes functionality that the web browser implements when processed by the requesting web browser. As will be discussed in greater detail below, the search web page 26 includes an autocomplete service 28 that is configured to present search query suggestions to the user as the user enters characters into a query dialog box 30.

The back-end component of the search engine 24 is a query engine 32 that receives search queries from the search web page 26 and performs a search based on each search query. The query engine 32 returns the results of the search query to the search web page 26, which in turn presents the results to the user on a display device. The results may include, for example, a list of URIs, each of which corresponds to a search result identified by the query engine 32. The user may then select a search result from the list of search results by selecting the search result and determine whether the selected search result provided the desired information or not. If not, the user may select another search result from the list of search results or may enter a different search query.

Note that, because the search engine 24 is a component of the computing device 16, functionality implemented by the search engine 24 may be attributed to the computing device 16 or the search engine server system 12 generally. Moreover, in examples where the search engine 24 comprises software instructions that program the processor device 18 to carry out functionality discussed herein, functionality implemented by the search engine 24 may be attributed herein to the processor device 18.

The search engine server system 12 also includes a preferred search query identifier 34 that, as explained in greater detail below, operates to generate a predetermined list of search query suggestions 36 that is utilized by the autocomplete service 28 to provide search query suggestions to the user. The preferred search query identifier 34 accesses and analyzes search query information 38 to generate the list of search query suggestions 36. The search query information 38 contains information about previous search queries received and processed by the query engine 32, the search results returned in response to such search queries, and subsequent actions taken by users in response to receiving the search results. Based on an analysis of the search query information 38 and one or more criteria, the preferred search query identifier 34 selects a subset of the search queries from the search query information 38 that are deemed to be "good" searches. What constitutes a good search is based on the criteria. Examples of such criteria will be discussed in greater detail herein.

The list of search query suggestions 36 may comprise a plurality of entries, each entry containing a search query, and comprising one or more search terms. The phrase "search term" as used herein refers to a stream of characters that are delimited in some manner, such as by spaces or some other predetermined character or characters in accordance with the syntax of the search engine 24. For example, a search query such as "truck stop I-95" comprises 3 search terms, "truck", "stop" and "I-95". The term "search query" as used herein refers to the search terms that are submitted to the query engine 32, and may comprise one or more search terms. For example, one search query may comprise "truck" and another search query may comprise "truck stop". In some examples, the search query entries in the list of search query suggestions 36 may be ordered based on a score attributed to the search query by the preferred search query identifier 34, or may be ordered based on some other criterion, such as popularity. The score, in turn, is based on how good the search query is determined to be. Thus, better performing search queries of the "good" search queries are at the top of the list of entries and poorer performing search queries of the "good" search queries are nearer the bottom of the list of entries.

The environment 10 includes a client computing device 39, which in turn includes a processor device 40, a memory 42, and display device 44. The client computing device 39 may be thousands of miles from the search engine location 14. For example, the search engine location 14 may be in Nevada, and the client computing device may be in Taiwan.

The term "content delivery network", as used herein, refers to a distributed platform of caching servers that helps minimize delays in loading web page content by providing the requested content from a location that is physically closer to the requester than the physical distance between the originating server that originates the requested content and the requester. This reduces latency because web content requested by a user from a web server that may be thousands of miles away may be cached at a CDN that is only hundreds of miles away. As an example, when a client computing device requests a web page from a particular domain, the request for the web page, in a manner that is typically completely transparent to the client computing device, is first routed to a nearby CDN. If the CDN has the requested web page, the web page is sent from the CDN to the client computing device, eliminating the additional time that it would otherwise take for the request to travel all the way to the originating host, and the time for the response to travel all the way from the originating host to the client computing device. If the CDN does not have the requested web page, the CDN requests the web page from the originating host, and upon receipt, serves the web page to the client computing device. However, the CDN caches (i.e., stores) the web page for future use, such that any other request for the same web page can be satisfied by the CDN without having to communicate with the originating host. CDN service providers include, for example, Akamai®, Cloudflare®, and the like.

In some examples, the environment 10 also includes a content delivery network (CDN) 46. The CDN 46 comprises a plurality of geographically dispersed data centers, referred to as CDN points-of-presence (POP) 48-1-48-N (generally, CDN POPs 48). For example, each of the CDN POPs 48 may be located in a different country. Each CDN POPs 48 includes a corresponding CDN server system 50-1-50-N, which comprises one or more CDN cache server computing devices 52. The CDN cache server computing devices 52 at each CDN POP 48 may be load balanced or otherwise configured to relatively equally service requests for content.

For purposes of illustrating client-based search query autocomplete according to one example, assume that a user 54 enters into a web browser 56 executing on the client computing device 39 a URI that corresponds to the search engine 24. The term "client" in the phrase client computing device 39 is used simply to distinguish the client computing device 39 from other computing devices and does not imply a specialized type of computing device. The client computing device 39 may comprise any type of computing device suitable for running a web browser, such as, by way of non-limiting example, a desktop or laptop computer, a smartphone, a computing tablet, or the like.

The web browser 56 generates a search web page (S.W.P.) request 58 that contains the URI, and sends the search web page request 58. The search web page request 58 is routed to the CDN server system 50-2. Assume that this is first time the URI has been requested from the CDN server system 50-2. The CDN server system 50-2 determines that the CDN server system 50-2 does not have the search web page 26 in the cache, and thus sends the search web page request 58 to the search engine server system 12 to retrieve the search web page 26. A web server component (not illustrated) of the search engine server system 12, in response to the search web page request 58, sends a copy 26-C of the search web page 26 to the CDN server system 50-2. The CDN server system 50-2 caches (i.e., stores) (not illustrated) the search web page 26-C so that subsequent requests for the search web page 26 can be serviced by the CDN server system 50-2 rather than the search engine server system 12. The CDN server system 50-2 also sends the search web page 26-C to the client computing device 39.

Figure 1B:
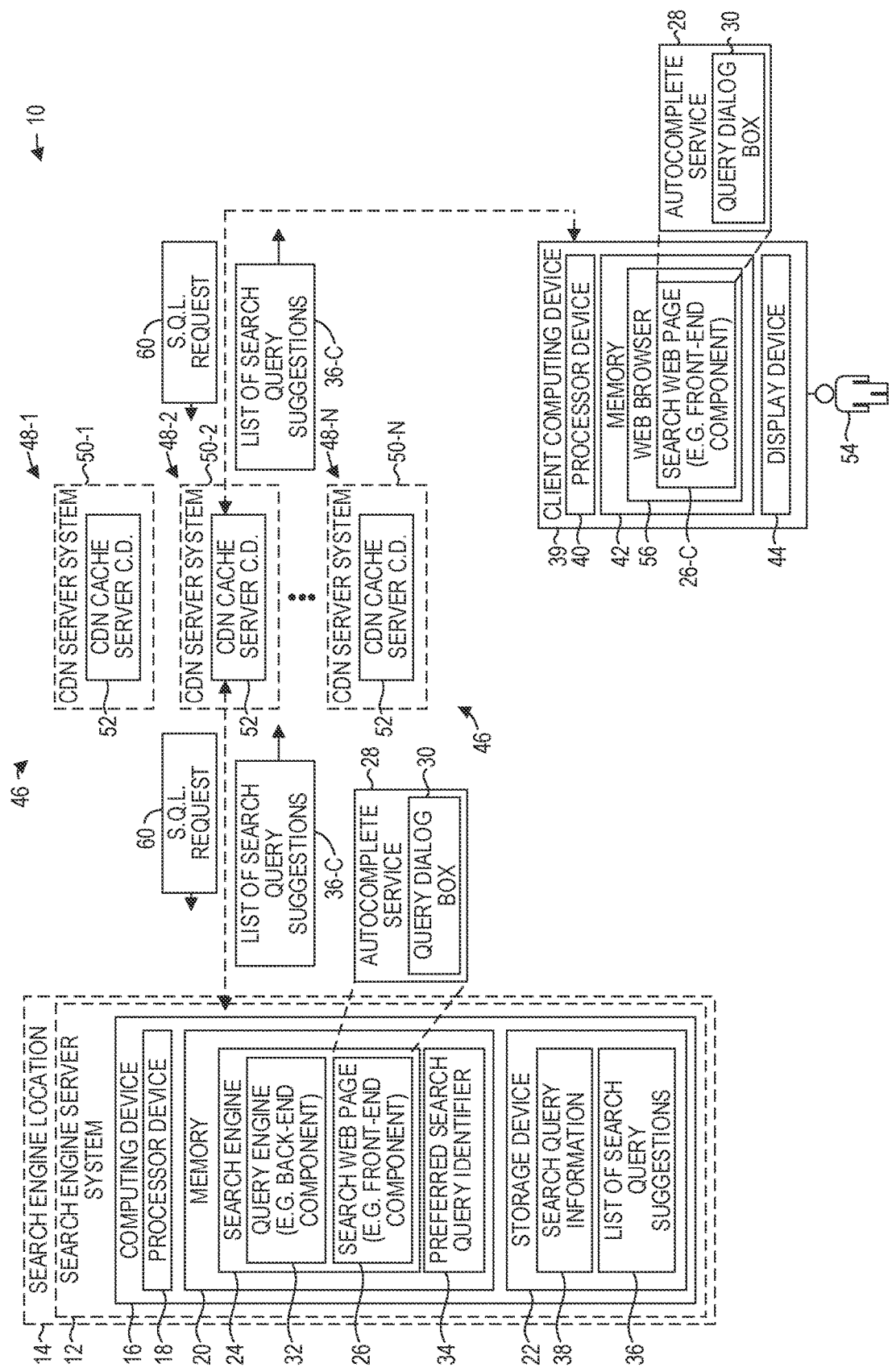

Referring now to FIG. 1B, the web browser 56 loads the search web page 26-C. During the loading phase or thereafter, the autocomplete service 28 generates a search query list (S.Q.L.) request 60 that contains a URI of the list of search query suggestions 36, and sends the search query list request 60. In one implementation, the search web page 26-C includes an onLoad event that occurs when the search web page 26-C loads. A JavaScript function of the autocomplete service 28 sends the search query list request 60, and registers a callback function to be called when the list of search query suggestions 36 has been received.

The search query list request 60 is routed to the CDN server system 50-2. Assume that this is the first time the URI has been requested from the CDN server system 50-2. The CDN server system 50-2 determines that the CDN server system 50-2 does not have the list of search query suggestions 36 in the cache, and thus sends the search query list request 60 to the search engine server system 12 to retrieve the list of search query suggestions 36. The search engine server system 12, in response to the search query list request 60, sends a copy 36-C of the list of search query suggestions 36 to the CDN server system 50-2. The CDN server system 50-2 caches (i.e., stores) (not illustrated) the list of search query suggestions 36-C so that subsequent requests for the list of search query suggestions 36 can be serviced by the CDN server system 50-2 rather than the search engine server system 12. The CDN server system 50-2 also sends the list of search query suggestions 36 to the client computing device 39.

Figure 1C:
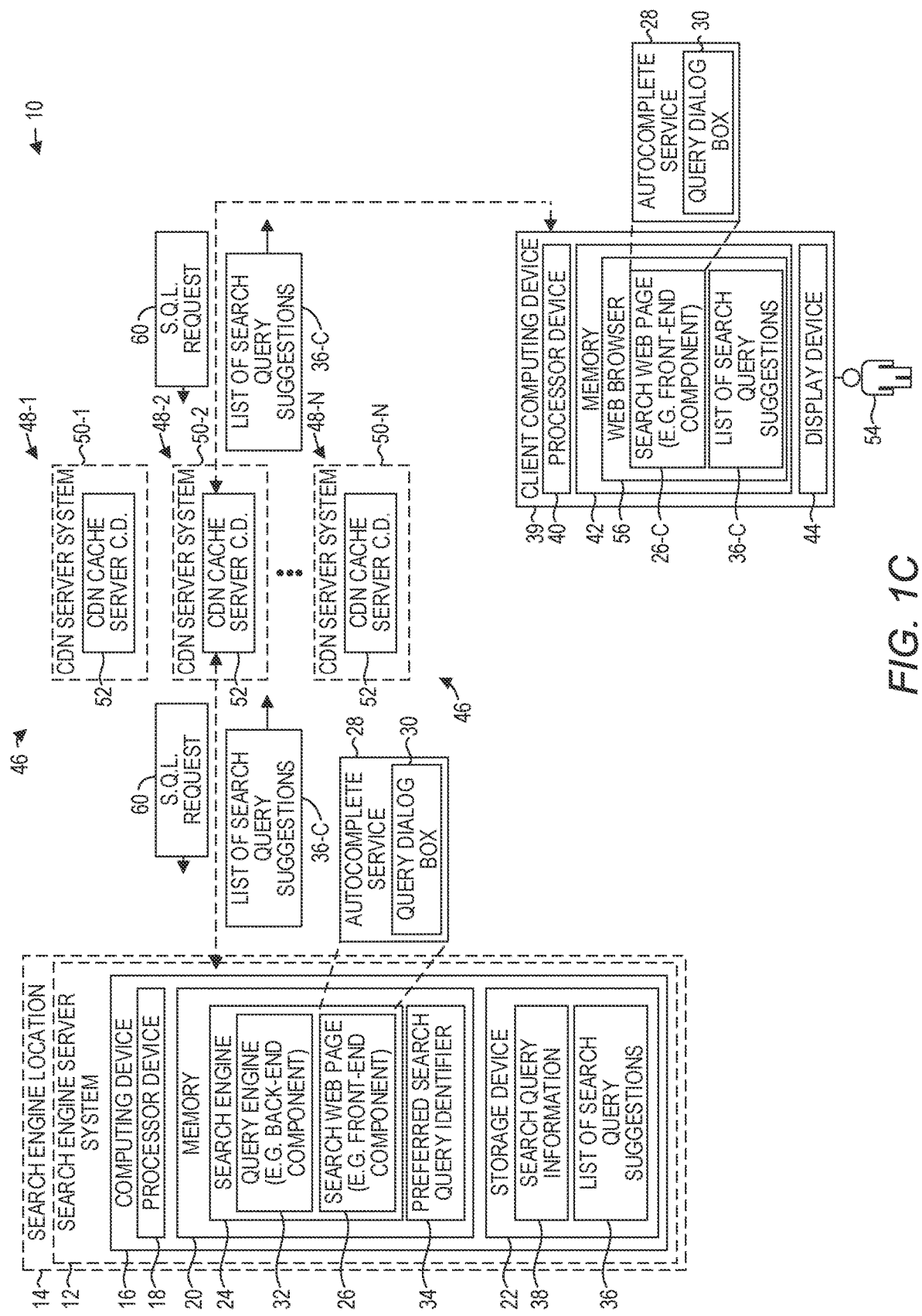

Referring now to FIG. 1C, the web browser 56 presents the query dialog box 30 on the display device 44. The user 54 begins entering a search query into the query dialog box 30. As the user 54 begins to type in the first character of the first search term, or a predetermined number of characters, the autocomplete service 28 detects that the user 54 is entering a search query. The autocomplete service 28 accesses the list of search query suggestions 36-C and searches the list of search query suggestions 36-C for search query suggestions based on the characters entered by the user 54. For example, the autocomplete service 28 may compare the characters entered by the user 54 to each search query in the list of search query suggestions 36-C and generate a subset of search queries that includes each search query that matches the characters.

The autocomplete service 28 presents the subset of search queries on the display device 44 substantially instantaneously while the user 54 is entering the search query. Note that the autocomplete service 28 need not communicate with either the CDN server system 50-2 or the search engine server system 12, thereby eliminating both network traffic, and the latency that would otherwise occur. The user 54 may select a search query suggested by the autocomplete service 28 or the user 54 may continue to enter additional characters. As each additional character is entered, the autocomplete service 28 may repeat the process of determining the subset of search queries and refreshing the display device 44 with the most recently determined subset of search queries, consistent with the characters being entered by the user 54.

Figure 2:
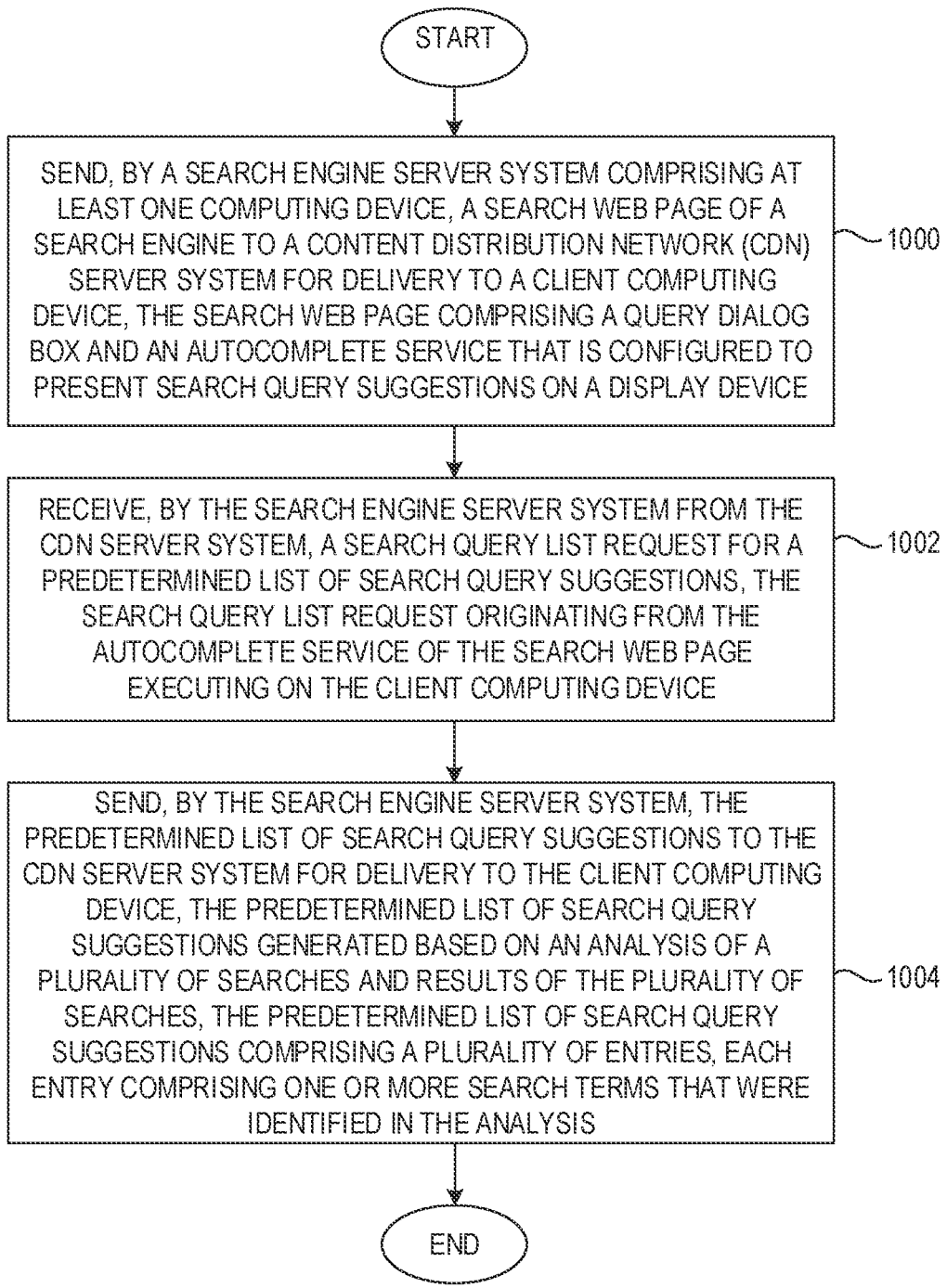
FIG. 2 is a flowchart of a method for providing client-based search query autocomplete according to one example.

FIG. 2 is a flowchart of a method for providing client-based search query autocomplete according to one example. FIG. 2 will be discussed in conjunction with FIGS. 1A-1C. A web server component of the search engine server system 12, which includes the at least one computing device 16, sends the search web page 26 of the search engine 24 to the CDN server system 50-2 for delivery to the client computing device 39. The search web page 26 includes the query dialog box 30 and the autocomplete service 28 that is configured to present search query suggestions on a display device (FIG. 2, block 1000). The search engine server system 12 receives, from the CDN server system 50-2, the search query list request 60 for the predetermined list of search query suggestions 36, the search query list request 60 originating from the autocomplete service 28 of the search web page 26-C executing on the client computing device 39 (FIG. 2, block 1002). The search engine server system 12 sends the predetermined list of search query suggestions 36-C to the CDN server system 50-2 for delivery to the client computing device 39, the predetermined list of search query suggestions 36-C generated based on an analysis of a plurality of searches and results of the plurality of searches. The predetermined list of search query suggestions 36-C includes a plurality of entries, each entry comprising one or more search terms that were identified in the analysis (FIG. 2, block 1004).

Note that if any subsequent requests for the search web page 26-C or the list of search query suggestions 36-C are received by the CDN server system 50-2, whether from the client computing device 39 or any other client computing device that is serviced by the CDN server system 50-2, the CDN server system 50-2 may serve the search web page 26-C or the list of search query suggestions 36-C to the requestor without having to request the search web page 26 or the list of search query suggestions 36 from the search engine server system 12, both improving response time for the respective client computing device and reducing network traffic.

Figure 3:
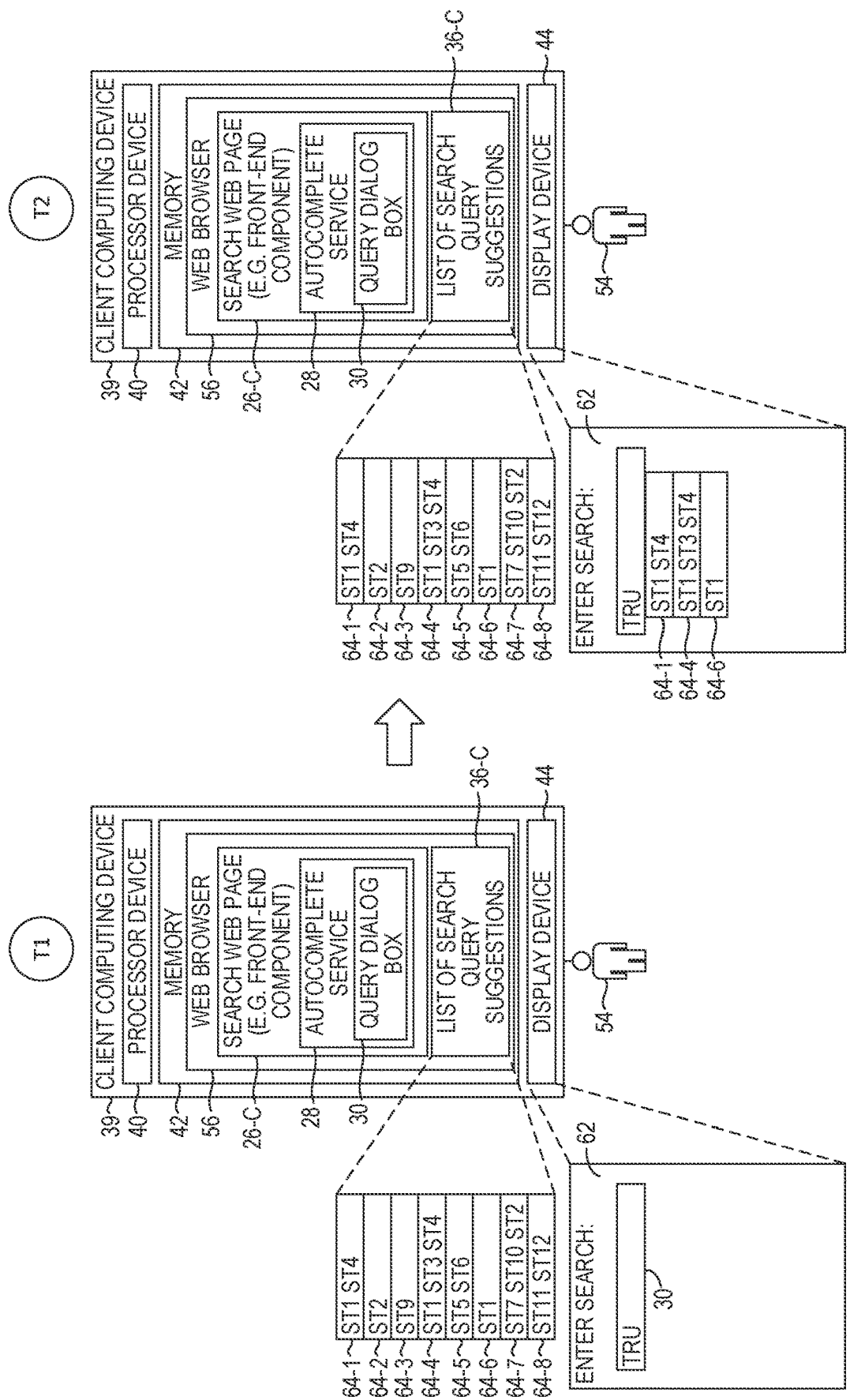
FIG. 3 is a block diagram of a client computing device at two different points in time illustrating client-based search query autocomplete according to one example.

FIG. 3 is a block diagram of a client computing device at two different points in time illustrating client-based search query autocomplete according to one example. At some point during the loading phase of the search web page 26-C, or thereafter, the web browser 56 presents, on the display device 44, the query dialog box 30 in a user interface 62 defined by the search web page 26-C. The user 54 begins entering a search query and types the letters "TRU" in the query dialog box 30. The autocomplete service 28 detects the entry of the characters "TRU" in the query dialog box 30. The autocomplete service 28 may begin the process of determining search query suggestions upon the entry of the first character, or upon the entry of a predetermined number of characters, such as three characters. At a time T1, the autocomplete service 28 searches the predetermined list of search query suggestions 36-C based on the characters "TRU" to identify a subset of search query suggestions.

The predetermined list of search query suggestions 36-C comprises a plurality of entries 64-1-64-8 (generally, entries 64), each of which contains a search query deemed by the preferred search query identifier 34 to be a "good" search query. While for purposes of illustration and simplicity the predetermined list of search query suggestions 36-C is illustrated as having eight entries 64, in practice, the predetermined list of search query suggestions 36-C may have hundreds or thousands of entries 64. In FIG. 3, search terms in the entries 64 are represented by the letters "ST" and a number. Different numbers reflect different search terms, and the same number reflects the same search terms. In practice, the entries 64 would contain the actual search terms, such as "truck", "truck stop", or the like.

As discussed above, the entries 64-1-64-8 may be ordered based on a score attributed to the respective search query by the preferred search query identifier 34. Thus, better performing search queries of the "good" search queries are at the top of the list of entries 64-1-64-8 and poorer performing search queries of the "good" search queries are nearer the bottom of the list of entries 64-1-64-8.

The autocomplete service 28 searches the predetermined list of search query suggestions 36-C based on the characters "TRU". For example, the autocomplete service 28 may compare the characters "TRU" to determine if the characters "TRU" match any of the search terms contained in the entries 64-1-64-8. The autocomplete service 28 may select each entry 64 that contains a search term that includes the character string "TRU". In some implementations, the autocomplete service 28 may select only those entries 64 that begin with the same sequence of character(s), in this example, the character string "TRU". Assume for purposes of illustration that the search term ST1 comprises the word "truck", and the autocomplete service 28 thus selects the entries 64-1, 64-4, and 64-6 as the subset of search queries to present to the user 54. At a time T2, the autocomplete service 28 presents the subset of queries in the user interface 62 on the display device 44. The user 54 may select one of the suggested search queries. In response, the search web page 26-C sends the search query to the search engine server system 12. The query engine 32 performs a search and sends the search to the client computing device 39 for presentation on the display device 44.

Figure 4:
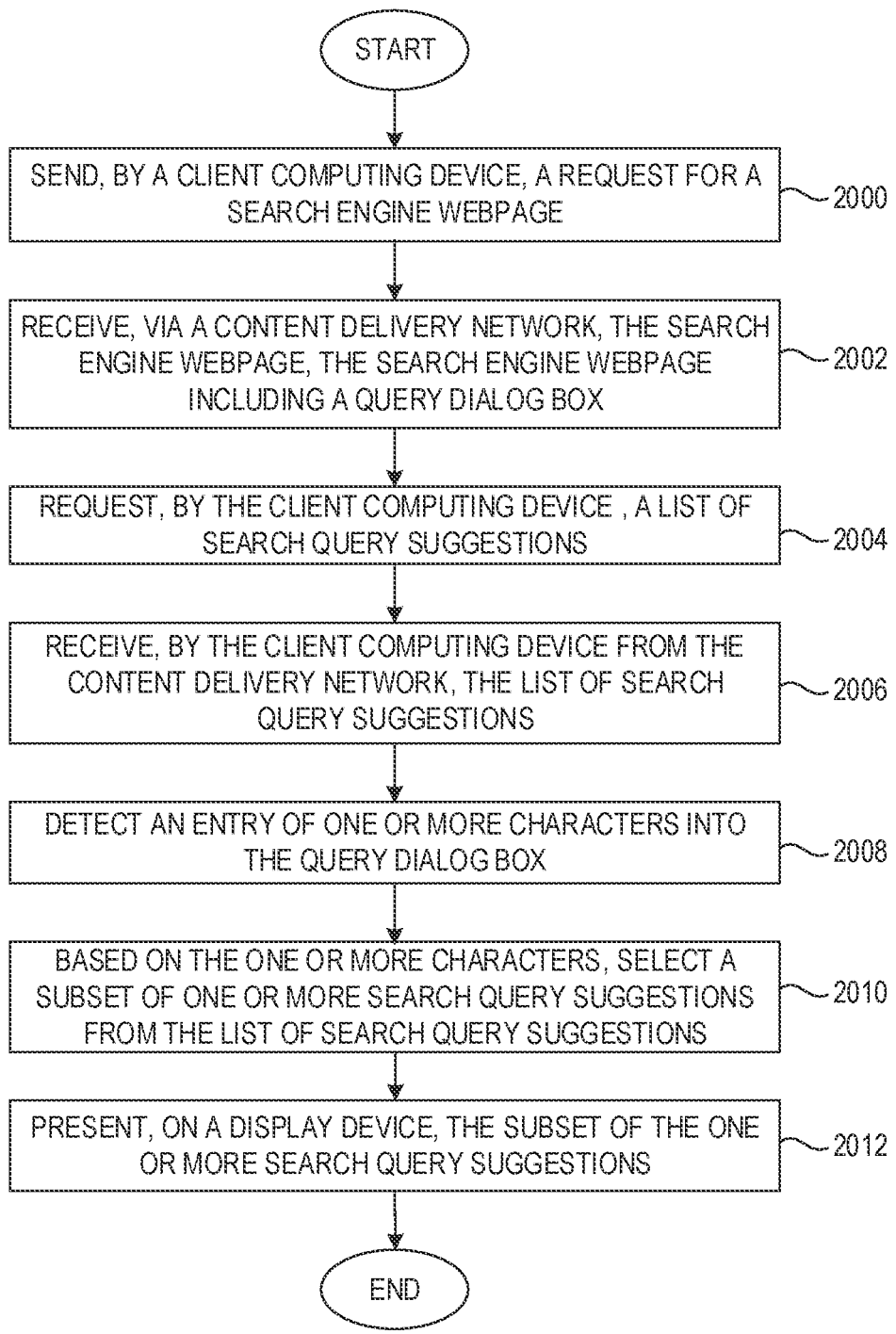
FIG. 4 is a flowchart of a method for providing client-based search query autocomplete from the perspective of the client computing device, according to one example.

FIG. 4 is a flowchart of a method for providing client-based search query autocomplete from the perspective of the client computing device 39, according to one example. FIG. 4 will be discussed in conjunction with FIGS. 1A-1C and FIG. 3. Note that because the web browser 56, which loads and facilitates the functionality of the search web page 26, is a component of the client computing device 39, functionality implemented by the search web page 26 via the web browser 56 may be attributed to the client computing device 39 generally. Moreover, where the web browser 56 and the search web page 26 comprise software instructions that program the processor device 40 to carry out functionality discussed herein, functionality implemented by the web browser 56 and the search web page 26 may be attributed herein to the processor device 40.

The client computing device 39 sends the search web page request 58 for the search web page 26 (FIG. 4, block 2000). The client computing device 39 receives, via the CDN 46, the search web page 26-C, the search web page 26-C including the query dialog box 30 (FIG. 4, block 2002). The client computing device 39 requests the list of search query suggestions 36 (FIG. 4, block 2004). The client computing device 39 receives, from the CDN 46, the list of search query suggestions 36-C (FIG. 4, block 2006). The client computing device 39 detects an entry of one or more characters into the query dialog box 30 (FIG. 4, block 2008). Based on the one or more characters, the client computing device 39 selects one or more search query suggestions from the list of search query suggestions 36-C (FIG. 4, block 2010). The client computing device 39 presents, on the display device 44, the one or more search query suggestions (FIG. 4, block 2012).

Note that while the examples have been illustrated as using a CDN, in other implementations, a CDN is not used, and the interactions between the client computing device 39 and the search engine server system 12 are direct.

Figure 5:
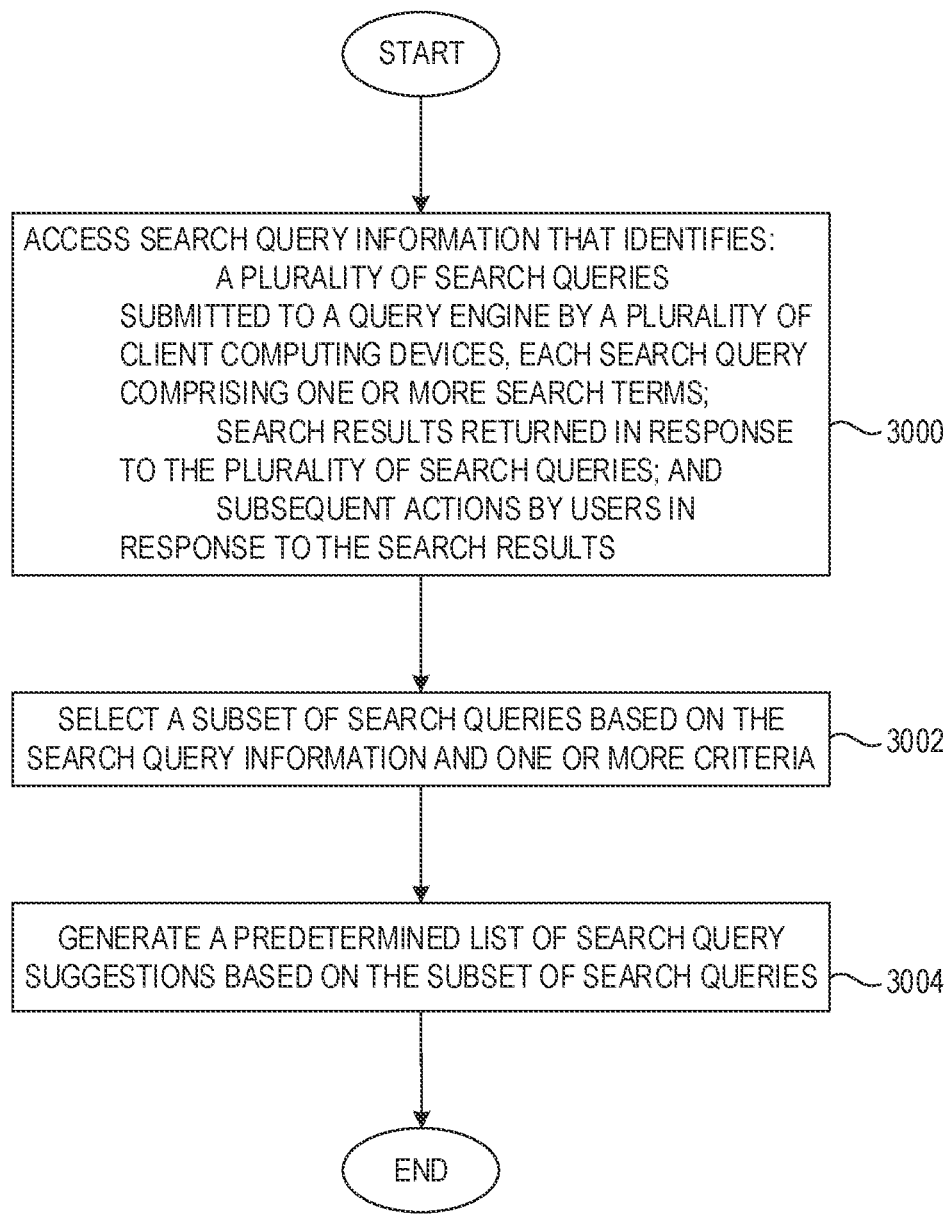
FIG. 5 is a flowchart of a method for generating a predetermined list of query suggestions, according to one example.

FIG. 5 is a flowchart of a method for generating the predetermined list of search query suggestions 36, according to one example. FIG. 5 will be discussed in conjunction with FIG. 1A. The preferred search query identifier 34 accesses the search query information 38. The search query information 38 identifies: a plurality of search queries submitted to the query engine 32 by a plurality of client computing devices, each search query comprising one or more search terms; the search results returned in response to the search queries; and subsequent actions by users in response to the search results (FIG. 5, block 3000). In some implementations the search query information 38 may also include the ordering of the search results, the date and time of the user inputs, an identifier of the user performing the interaction, the type of web browser used, the IP address of the user's computer on the Internet, one or more filtering criteria such as faceting information or other criteria to narrow search results to a relevant section of the indexed corpus.

The preferred search query identifier 34 selects a subset of search queries based on the search query information 38 and one or more criteria (FIG. 5, block 3002). One criterion may be, by way of non-limiting example, a click-through result that indicates, for each respective search query, that a user selected a search query result in a list of search query results provided in response to the respective search query, or did not select any search query result in the list of search query results provided in response to the respective search query. Search queries that have a click-through may be rated higher (i.e., be scored as "better") than search queries that did not have a click-through. Another criterion may be, by way of non-limiting example, a location of a selected search query result on the list of search query results provided in response to a respective search query. For example, selected search query results that are nearer the top of the search query results may be rated higher (i.e., be scored as "better") than search queries wherein the selected search query was lower in the search query results. The preferred search query identifier 34 may rank all search queries based on the criteria, and then select a subset of the search queries, such as the top one hundred search queries, top 500 search queries, or the like.

The preferred search query identifier 34 generates the predetermined list of search query suggestions 36 based on the selected subset of search queries (FIG. 5, block 3004).

Figure 6:
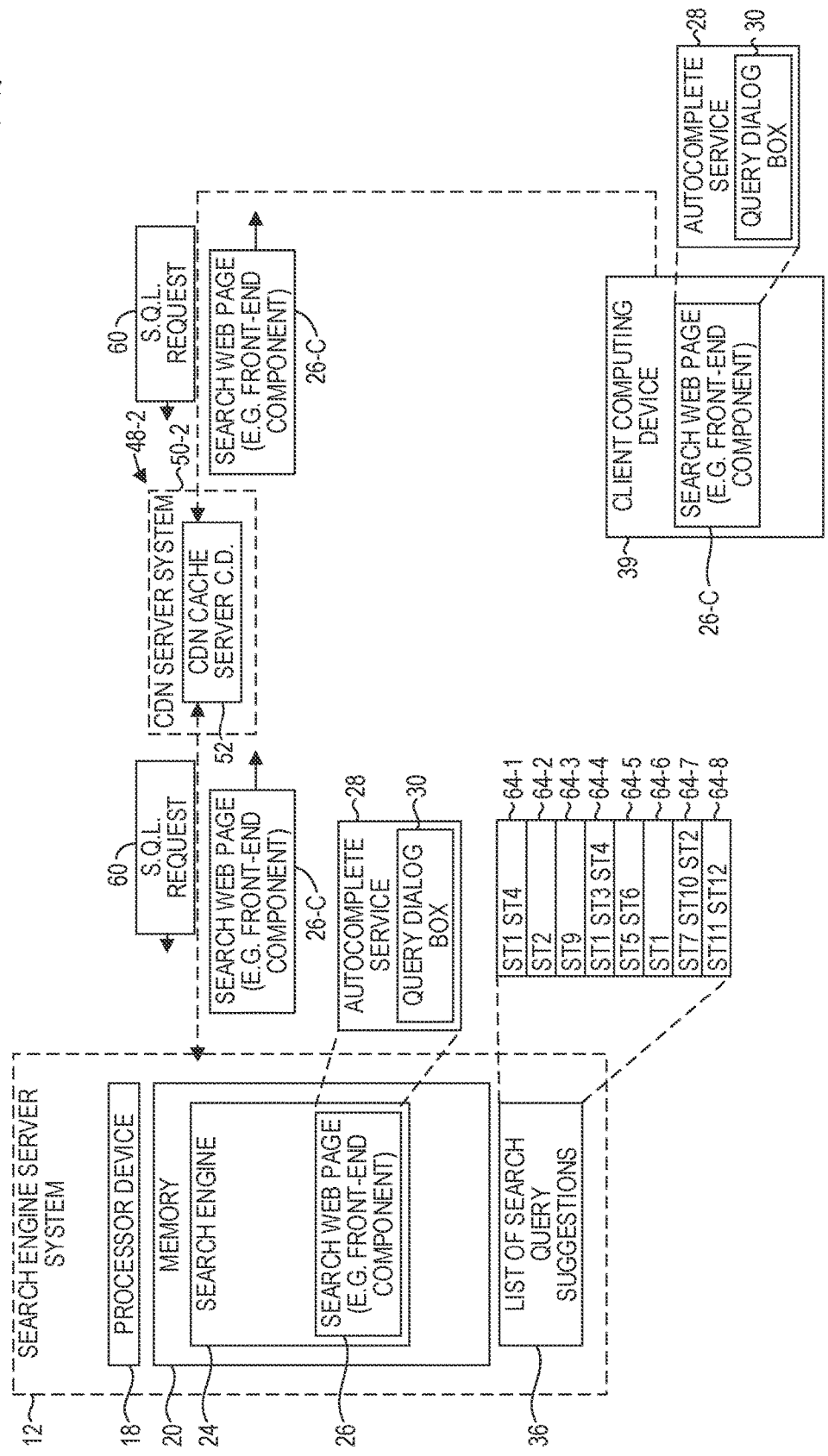
FIG. 6 is a simplified block diagram of the environment illustrated in FIG. 1 according to one implementation.

FIG. 6 is a simplified block diagram of the environment 10 illustrated in FIGS. 1A-1C according to one implementation. The environment 10 includes the search engine server system 12 that includes the at least one memory 20 and at least one processor device 18 coupled to the at least one memory 20. The processor device 18 is to send the search web page 26 of the search engine 24 to the content distribution network (CDN) server system 50-2 for delivery to the client computing device 39, the search web page 26 including the query dialog box 30 and the autocomplete service 28 that is configured to present search query suggestions on a display device. The processor device 18 is to receive, from the CDN server system 50-2, the search query list request 60 for the predetermined list of search query suggestions 36, the search query list request 60 originating from the autocomplete service 28 of the search web page 26-C executing on the client computing device 39. The processor device 18 is to send the predetermined list of search query suggestions 36 to the CDN server system 50-2 for delivery to the client computing device 39. The predetermined list of search query suggestions 36 was generated based on an analysis of a plurality of searches and results of the plurality of searches. The predetermined list of search query suggestions 36 includes the plurality of entries 64, each entry 64 comprising one or more search terms that were identified in the analysis.

Figure 7:
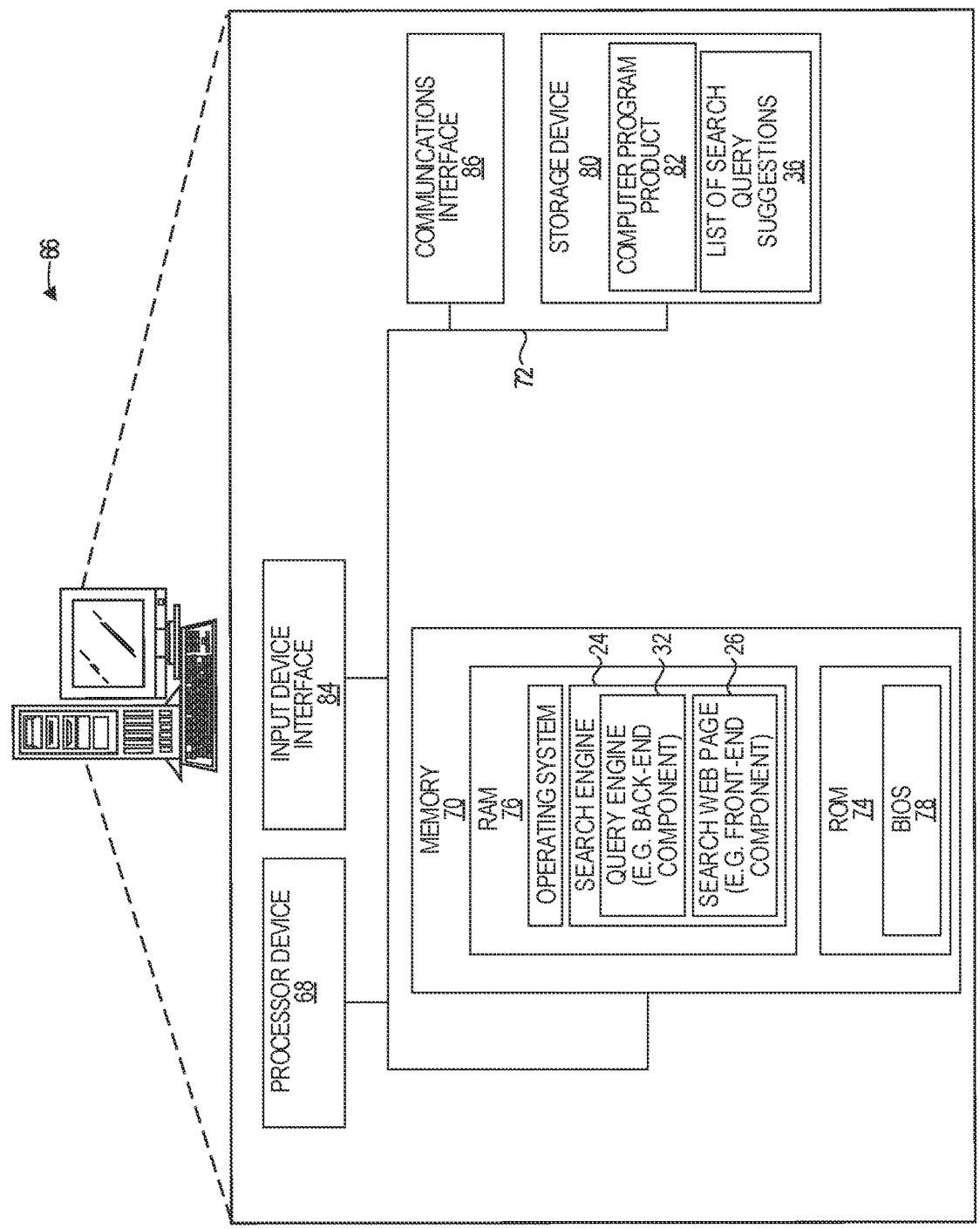
FIG. 7 is a block diagram of a computing device suitable for implementing any of the computing devices discussed herein.

FIG. 7 is a block diagram of a computing device 66 suitable for implementing the computing device 16 and/or the client computing device 39 according to one example. The computing device 66 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 66 includes a processor device 68, a system memory 70, and a system bus 72. The system bus 72 provides an interface for system components including, but not limited to, the system memory 70 and the processor device 68. The processor device 68 can be any commercially available or proprietary processor.

The system bus 72 may be any of several types of bus structures that may further interconnect to a memory bus (with or without a memory controller), a peripheral bus, and/or a local bus using any of a variety of commercially available bus architectures. The system memory 70 may include non-volatile memory 74 (e.g., read-only memory (ROM), erasable programmable read-only memory (EPROM), electrically erasable programmable read-only memory (EEPROM), etc.), and volatile memory 76 (e.g., random-access memory (RAM)). A basic input/output system (BIOS) 78 may be stored in the non-volatile memory 74 and can include the basic routines that help to transfer information between elements within the computing device 66. The volatile memory 76 may also include a high-speed RAM, such as static RAM, for caching data.

The computing device 66 may further include or be coupled to a non-transitory computer-readable storage medium such as a storage device 80, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 80 and other drives associated with computer-readable media and computer-usable media may provide non-volatile storage of data, data structures, computer-executable instructions, and the like. When used to implement the computing device 16, the storage device 80 may store, for example, the list of search query suggestions 36.

A number of modules can be stored in the storage device 80 and in the volatile memory 76, including an operating system and one or more program modules, such as the search engine 24, or in the case of the client computing device 39, the search web page 26.

All or a portion of the examples may be implemented as a computer program product 82 stored on a transitory or non-transitory computer-usable or computer-readable storage medium, such as the storage device 80, which includes complex programming instructions, such as complex computer-readable program code, to cause the processor device 68 to carry out the steps described herein. Thus, the computer-readable program code can comprise software instructions for implementing the functionality of the examples described herein when executed on the processor device 68.

An operator may also be able to enter one or more configuration commands through a keyboard (not illustrated), a pointing device such as a mouse (not illustrated), or a touch-sensitive surface such as a display device. Such input devices may be connected to the processor device 68 through an input device interface 84 that is coupled to the system bus 72 but can be connected by other interfaces such as a parallel port, an Institute of Electrical and Electronic Engineers (IEEE) 1394 serial port, a Universal Serial Bus (USB) port, an IR interface, and the like. The computing device 66 may also include a communications interface 86, such as an Ethernet transceiver or the like, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:

sending, by a search engine server system comprising at least one computing device, a search web page of a search engine to a content distribution network (CDN) server system for delivery to a client computing device, the search web page comprising a query dialog box and an autocomplete service that is configured to present search query suggestions on a display device and to request a predetermined list of search query suggestions from the search engine server system during a loading phase of the search web page;

receiving, by the search engine server system from the CDN server system, a search query list request for the predetermined list of search query suggestions, the search query list request originating from the autocomplete service of the search web page executing on the client computing device; and sending, by the search engine server system, the predetermined list of search query suggestions to the CDN server system for delivery to the client computing device, the predetermined list of search query suggestions generated based on an analysis of a plurality of searches and results of the plurality of searches, the predetermined list of search query suggestions comprising a plurality of entries, each entry comprising one or more search terms that were identified in the analysis.

2. The method of claim 1 further comprising:
prior to sending the search web page to the CDN server system, receiving, by the search engine server system from the CDN server system, a search web page request for the search web page, the search web page request originating from the client computing device.

3. The method of claim 1 wherein the search web page is configured to present, on a display device, the query dialog box.

4. The method of claim 1 wherein the autocomplete service is configured to:
detect entry of at least one character in the query dialog box;
access the predetermined list of search query suggestions;
search the predetermined list of search query suggestions based on the at least one character to identify a subset of search query suggestions; and
present, on the display device, the subset of search query suggestions.

5. The method of claim 1 further comprising:
determining, by the autocomplete service, that the search web page is loading on the client computing device;
in response to determining, by the autocomplete service, that the search web page is loading on the client computing device, requesting, from the search engine server system, the predetermined list of search query suggestions; and
receiving, from the CDN server system, the predetermined list of search query suggestions.

6. The method of claim 1 further comprising:
detecting entry of at least one character in the query dialog box;
searching the predetermined list of search query suggestions based on the at least one character to identify a subset of search queries; and
presenting, on the display device, the subset of search queries.

7. The method of claim 1 wherein the predetermined list of search query suggestions exists prior to the receipt of the search query list request.

8. A system comprising:
a search engine server system comprising:
at least one first memory and at least one first processor device coupled to the at least one first memory to:
send a search web page of a search engine to a content distribution network (CDN) server system for delivery to a client computing device, the search web page comprising a query dialog box and an autocomplete service that is configured to present search query suggestions on a display device and to request a predetermined list of search query suggestions from the search engine server system during a loading phase of the search web page;
receive, from the CDN server system, a search query list request for the predetermined list of search query suggestions, the search query list request originating from the autocomplete service of the search web page executing on the client computing device; and
send the predetermined list of search query suggestions to the CDN server system for delivery to the client computing device, the predetermined list of search query suggestions generated based on an analysis of a plurality of searches and results of the plurality of searches, the predetermined list of search query suggestions comprising a plurality of entries, each entry comprising one or more search terms that were identified in the analysis.

9. The system of claim 8 wherein the search web page is configured to present, on a display device, the query dialog box.

10. The system of claim 8 wherein the autocomplete service is configured to:
detect entry of at least one character in the query dialog box;
access the predetermined list of search query suggestions;
search the predetermined list of search query suggestions based on the at least one character to identify a subset of search query suggestions; and
present, on the display device, the subset of search query suggestions.

11. The system of claim 8 further comprising:
a second client computing device comprising:
a second memory; and
a second processor device coupled to the second memory to:
detect entry of at least one character in the query dialog box;
search the predetermined list of search query suggestions based on the at least one character to identify a subset of search queries; and
present, on the display device, the subset of search queries.

12. A non-transitory computer-readable storage medium that includes executable instructions to cause a processor device to:
send a search web page of a search engine to a content distribution network (CDN) server system for delivery to a client computing device, the search web page comprising a query dialog box and an autocomplete service that is configured to present search query suggestions on a display device and to request a predetermined list of search query suggestions from a search engine server system during a loading phase of the search web page;
receive, from the CDN server system, a search query list request for the predetermined list of search query suggestions, the search query list request originating from the autocomplete service of the search web page executing on the client computing device; and
send the predetermined list of search query suggestions to the CDN server system for delivery to the client computing device, the predetermined list of search query suggestions generated based on an analysis of a plurality of searches and results of the plurality of searches, the predetermined list of search query suggestions comprising a plurality of entries, each entry comprising one or more search terms that were identified in the analysis.

13. The non-transitory computer-readable storage medium of claim 12 wherein the autocomplete service is configured to:
detect entry of at least one character in the query dialog box;
search the predetermined list of search query suggestions based on the at least one character to identify a subset of search queries; and
present, on the display device, the subset of search queries.

14. The non-transitory computer-readable storage medium of claim 12, wherein the instructions further cause the processor device to:

prior to sending the search web page to the CDN server system, receive, by a search engine server system from the CDN server system, a search web page request for the search web page, the search web page request originating from the client computing device.

15. A method comprising:

sending, by a search engine server system comprising at least one computing device, a search web page of a search engine to a content distribution network (CDN) server system for delivery to a client computing device, the search web page comprising a query dialog box and an autocomplete service that is configured to present search query suggestions on a display device;

receiving, by the search engine server system from the CDN server system, a search query list request for a predetermined list of search query suggestions, the search query list request originating from the autocomplete service of the search web page executing on the client computing device;

sending, by the search engine server system, the predetermined list of search query suggestions to the CDN server system for delivery to the client computing device, the predetermined list of search query suggestions generated based on an analysis of a plurality of searches and results of the plurality of searches, the predetermined list of search query suggestions comprising a plurality of entries, each entry comprising one or more search terms that were identified in the analysis;

accessing, by the search engine server system, search query information that identifies:

a plurality of search queries submitted to the search engine by a plurality of client computing devices, each search query comprising one or more search terms;

search results returned in response to the plurality of search queries;

subsequent actions by users in response to the search results; and for at least some of the plurality of search queries:

a selection by a corresponding user of a particular search query result of a list of search query results provided in response to a respective search query;

selecting a subset of search queries based on the search query information and one or more criteria, wherein the one or more criteria are based at least in part on a location of the particular search query result on the list of search query results provided in response to the respective search query; and generating the predetermined list of search query suggestions based on the subset of search queries.

16. The method of claim 15 wherein the search query information identifies for at least some of the plurality of search queries:

a click-through result that indicates, for each respective query of the at least some of the plurality of search queries, that a user selected a search query result in a list of search query results provided in response to the respective search query, or did not select any search query result in the list of search query results provided in response to the respective search query; and wherein the one or more criteria are based at least in part on the click- through result.

17. A system comprising:

a search engine server system comprising:

at least one first memory and at least one first processor device coupled to the at least one first memory to:

send a search web page of a search engine to a content distribution network (CDN) server system for delivery to a client computing device, the search web page comprising a query dialog box and an autocomplete service that is configured to present search query suggestions on a display device;

receive, from the CDN server system, a search query list request for a predetermined list of search query suggestions, the search query list request originating from the autocomplete service of the search web page executing on the client computing device;

send the predetermined list of search query suggestions to the CDN server system for delivery to the client computing device, the predetermined list of search query suggestions generated based on an analysis of a plurality of searches and results of the plurality of searches, the predetermined list of search query suggestions comprising a plurality of entries, each entry comprising one or more search terms that were identified in the analysis;

access search query information that identifies:

a plurality of search queries submitted to the search engine by a plurality of client computing devices, each search query comprising one or more search terms;

search results returned in response to the plurality of search queries;

subsequent actions by users in response to the search results; and for at least some of the plurality of search queries:

a selection by a corresponding user of a particular search query result of a list of search query results provided in response to a respective search query;

select a subset of search queries based on the search query information and one or more criteria, wherein the one or more criteria are based at least in part on a location of the particular search query result on the list of search query results provided in response to the respective search query; and generate the predetermined list of search query suggestions based on the subset of search queries.

18. A non-transitory computer-readable storage medium that includes executable instructions to cause a processor device to:

send a search web page of a search engine to a content distribution network (CDN) server system for delivery to a client computing device, the search web page comprising a query dialog box and an autocomplete service that is configured to present search query suggestions on a display device;

receive, from the CDN server system, a search query list request for a predetermined list of search query suggestions, the search query list request originating from the autocomplete service of the search web page executing on the client computing device;

send the predetermined list of search query suggestions to the CDN server system for delivery to the client computing device, the predetermined list of search query suggestions generated based on an analysis of a plurality of searches and results of the plurality of searches, the predetermined list of search query suggestions comprising a plurality of entries, each entry comprising one or more search terms that were identified in the analysis;

access search query information that identifies:
  a plurality of search queries submitted to the search engine by a plurality of client computing devices, each search query comprising one or more search terms;
  search results returned in response to the plurality of search queries;
  subsequent actions by users in response to the search results; and
  for at least some of the plurality of search queries:
    a selection by a corresponding user of a particular search query result of a list of search query results provided in response to a respective search query;
select a subset of search queries based on the search query information and one or more criteria, wherein the one or more criteria are based at least in part on a location of the particular search query result on the list of search query results provided in response to the respective search query; and
generate the predetermined list of search query suggestions based on the subset of search queries.

\* \* \* \* \*